(12) United States Patent
Clark

(10) Patent No.: US 6,560,895 B1
(45) Date of Patent: May 13, 2003

(54) CHICKEN MANURE PROCESSING APPARATUS

(76) Inventor: Willard Clark, 72 County Rd. 4014, Crane Hill, AL (US) 35053

( * ) Notice: Subject to any disclaimer, the term of this patent is extended or adjusted under 35 U.S.C. 154(b) by 0 days.

(21) Appl. No.: 10/016,771

(22) Filed: Dec. 10, 2001

(51) Int. Cl.$^7$ .................................................. F26B 3/00
(52) U.S. Cl. ............................. 34/384; 34/171; 34/173; 34/498
(58) Field of Search .......................... 34/376, 384, 171, 34/173, 178, 498, 201, 186, 203; 435/290.2; 71/9

(56) References Cited

U.S. PATENT DOCUMENTS

| | | | | |
|---|---|---|---|---|
| 2,269,580 A | * | 1/1942 | Connolly ..................... | 263/26 |
| 2,633,412 A | * | 3/1953 | Eweson ..................... | 23/259.1 |
| 2,639,902 A | * | 5/1953 | Kuebler ........................ | 259/44 |
| 2,660,809 A | | 12/1953 | Morrison | |
| 3,114,622 A | * | 12/1963 | Hardy ............................. | 71/9 |
| 3,357,812 A | | 12/1967 | Snell | |
| 3,697,056 A | | 10/1972 | Prins, Sr. et al. | |
| 3,718,451 A | | 2/1973 | Baumann | |
| 3,755,917 A | * | 9/1973 | Lambert ..................... | 34/179 |
| 3,778,233 A | * | 12/1973 | Blough et al. ............. | 23/259.1 |
| 3,926,794 A | * | 12/1975 | Vahldieck ..................... | 210/5 |
| 3,939,280 A | | 2/1976 | Karnemaat | |
| 4,060,390 A | * | 11/1977 | Shimzu et al. ............. | 23/259.1 |
| 4,134,749 A | * | 1/1979 | Houser et al. ................... | 71/9 |
| 4,135,907 A | * | 1/1979 | Houser et al. ................... | 71/9 |
| 4,138,333 A | * | 2/1979 | Arms et al. ................. | 195/127 |
| 4,193,786 A | | 3/1980 | Brill | |
| 4,292,328 A | | 9/1981 | Coulthard et al. | |
| 4,410,348 A | | 10/1983 | Ito et al. | |
| 4,495,290 A | * | 1/1985 | Ito et al. ..................... | 435/315 |
| 4,909,825 A | | 3/1990 | Eigner | |
| 5,405,780 A | * | 4/1995 | Hamilton .................... | 435/315 |
| 5,409,831 A | | 4/1995 | Wright | |
| 5,434,080 A | * | 7/1995 | Schmutz ..................... | 435/316 |
| 5,561,917 A | * | 10/1996 | Ratajczek ..................... | 34/384 |
| 5,688,686 A | * | 11/1997 | Nakajima et al. ......... | 435/290.2 |
| 5,730,772 A | | 3/1998 | Staples | |
| 5,737,850 A | | 4/1998 | Hendrix | |
| 5,744,351 A | * | 4/1998 | Bryan-Brown ........... | 435/290.2 |
| 5,924,022 A | | 7/1999 | Beasley et al. | |
| 6,065,224 A | | 5/2000 | Eigner | |
| 6,284,529 B1 | * | 9/2001 | Carrerra .................. | 435/290.4 |

* cited by examiner

Primary Examiner—Ira S. Lazarus
Assistant Examiner—K. B. Rinehart
(74) Attorney, Agent, or Firm—Lanier Ford Shaver & Payne, P.C.; Gerald M. Walsh

(57) ABSTRACT

A manure processing apparatus is defined which has a processing bin and a plurality of augers, with the augers arranged vertically and adapted to move back and forth along the length and width of the processing bin. The apparatus further comprises an air conditioning system to compost the manure and to dry the manure to produce feed.

16 Claims, 5 Drawing Sheets

CHICKEN MANURE PROCESSING APPARATUS

BACKGROUND OF INVENTION

1. Field of the Invention

The invention relates to an apparatus for processing chicken manure and more particularly to an apparatus for homogenizing and drying chicken manure to produce fertilizer and animal feed.

2. Technical Background

Animal waste is converted into compost by the process of fermentation. Composting of manure requires continuous circulation of air homogeneously through the manure with control of temperature and moisture content. If the manure is not mixed with air, ammonia can accumulate and produce increased protein breakdown. The process includes at least three operations: agitation of the manure, homogenization, and simultaneous aeration to provide oxygen for aerobic decomposition by micro organisms. The compost is then dried to a moisture content of no more than 45%.

In the conventional process for composing chicken manure, the general practice has been to store or pile the organic materials to be composted for a certain period and to periodically turn them over at a proper time interval to promote aerobic fermentation, a proper amount of air being preferably fed to the stored materials from the bottom thereof during the storage. Plowing or turning the piled materials over is indispensable in order to uniformly mix the materials as well as to fractionalize the materials so as to substantially increase the total area of the surface of the materials exposed to air. The material is dried in the sun or in a drum-type drier heated by means of oil burners. Belt type driers can also be used in place of a drum-type drier. Attempts have also been made to perform these operations by means of indirect driers, such as, for example, tube-type driers, but these resulted in operational malfunctions due to clogging.

Prior use of poultry manure as a fertilizer material has been somewhat restricted by low nitrogen content and the often accompanying malodor. Preparation of the raw manure invariably leads to unwanted decomposition and loss of nitrogen. Malodor is not surprising and something of a byproduct of the decomposition process. Other drawbacks to wider use of this material as a fertilizer are evident from an overview of the prior art.

Fermentation is an aerobic thermophilic reaction wherein heat is generated as the mixture decomposes and the temperature of the mixture progressively rises to an optimum value. The mixture remains at this elevated temperature while the decomposition process continues for a period of time, depending upon such variables as moisture content, manner and extent of aeration, and the nature of the mixture ingredients. Thereafter the mixture gradually cools and the production of aerobic bacteria ceases. The aerobic thermophilic reaction is maximized when all portions of the mass are slowly aerated uniformly and to the proper extent. In order to aerate the mixture properly it is necessary to agitate the whole mass slowly in such a manner that substantially all portions of the material are exposed to an optimum amount of air for an optimum period of time. If the mass is agitated too violently or if the amount of air is excessive, the mixture will be dried and cooled. On the other hand, if the air supplied is less than the optimum amount required or if the mass is not agitated properly the bacterial activity will not reach its maximum potential and the composting process will require an unduly long period of time.

Many devices are known which combine agitation, homogenization, and aeration. Agitation and homogenization have used a variety of means such as rotating milling mechanisms and augers, conveyors with agitators, horizontally reciprocating or linearly moving rakes or plows, and rotary drums with or without baffles or radial fingers projecting into the mixture. With such types of equipment the proper aeration has not been achieved because homogenization is not complete and uniform. For example, with rakes it is impractical, if not impossible, to agitate the mass so that the oxygen in the air will come into intimate contact with all portions of the material for the required time interval. In the case of rotary drums, some portions of the mass remain stagnant for an unduly long period of time while other portions are caused to fall or tumble rapidly through the air stream directed through the drum. In either case, substantially all portions of the mixture in the drum are not uniformly exposed to the air for the required period of time to achieve the optimum operating conditions to allow the reaction to progress at its maximum potential rate and to produce the maximum nutrient content.

Besides providing an excellent fertilizer, chicken manure can serve as a high grade food supplement comprising as much as 40% of the finished feed for chickens, having a protein value as high as 20% by weight. Chicken manure processed as feed can result in longer life of the animal as well as increased egg production. Chicken manure must be dried to about 10–17% moisture content and sterilized to be used as feed without composting. However, without complete composting or addition of unacceptable chemicals such as formaldehyde and urea, the final feed product will have an unacceptable odor.

At the present time there are no known chicken manure processing devices for practical commercial use which can produce compost or feed that is devoid of objectionable odor. This is because existing devices cannot adequately homogenize and aerate an entire mass of manure without expensive, complicated, and impractical devices.

SUMMARY OF THE INVENTION

The present invention processes chicken manure to produce animal feed and compost for fertilizer. The apparatus agitates, homogenizes, composts, and dries the manure to produce fertilizer, and agitates, homogenizes, and rapidly dries the manure to produce feed. Both the compost and feed have no objectionable odor. The apparatus uses a system of augers arranged vertically so that the manure is continuously raised, from the bottom of the processing bin to the top, from one end of the processing bin to the other end, and from one side of the processing bin to the other side. The augers thereby agitate and homogenize large quantities of manure, allowing air and heat from an air conditioning system to be distributed uniformly through the entire mass of manure. The thorough composting and/or the thorough drying create a fertilizer or feed that is devoid of objectionable odor.

DETAILED DESCRIPTION OF THE PREFERRED EMBODIMENTS

While the following description details the preferred embodiments of the present invention, it is to be understood that the invention is not limited in its application to the details of construction and arrangement of the parts illustrated in the accompanying drawings, since the invention is capable of other embodiments and of being practiced in various ways.

Figure 1:
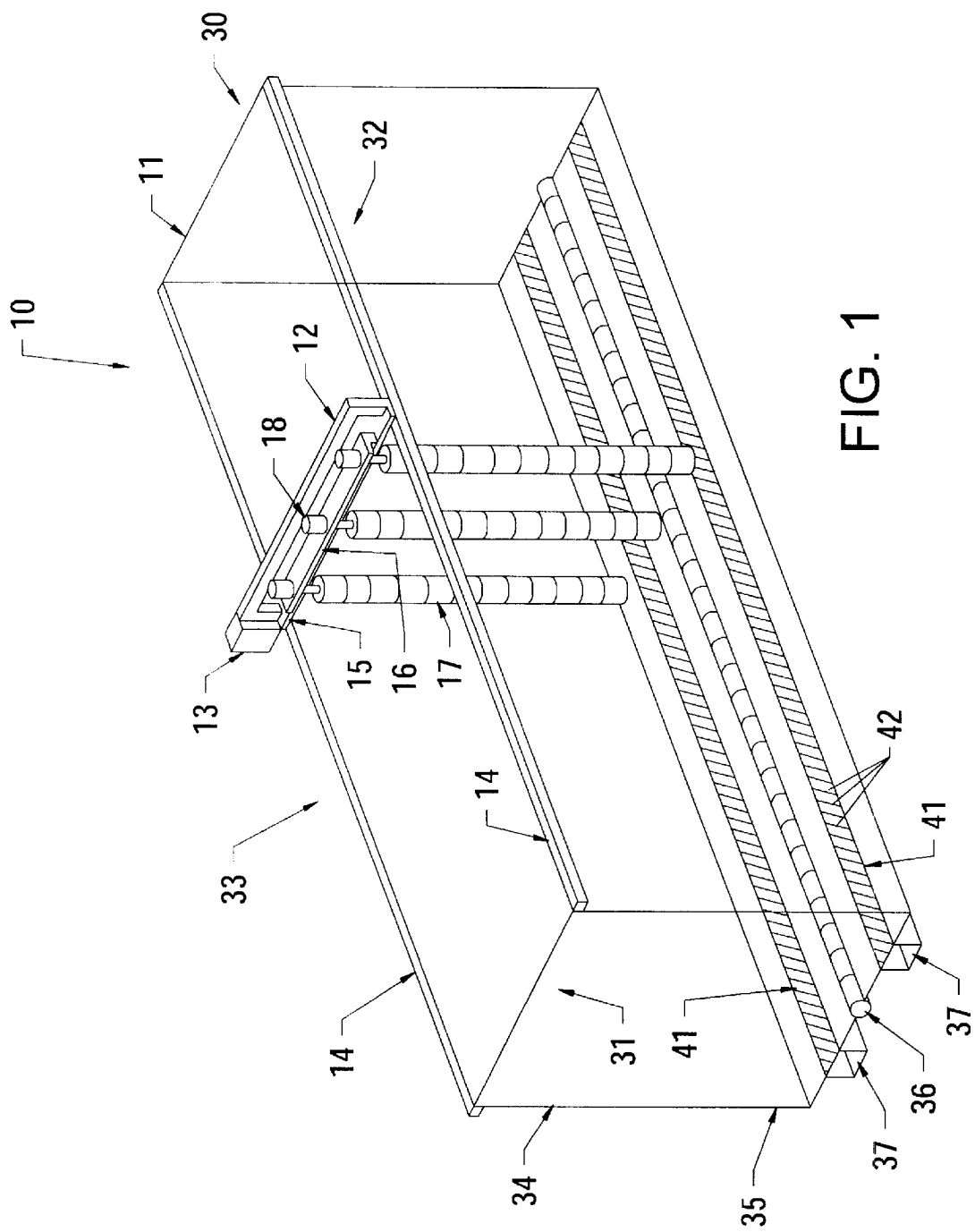
FIG. 1 is a diagrammatic perspective view of the manure processing apparatus of the present invention.

FIG. 1 is a diagrammatic view of the manure processing apparatus 10 if the present invention. Apparatus 10 has a processing bin 11 having front end 30, back end 31, and cross-beam 12. Cross-beam 12 extends from a first side 32 to a second side 33 of processing bin 11, and across the top of processing bin 11. Cross-beam 12 rides on cross-beam tracks 14 which extend from the front end 30 to the back end 31 and along the top of processing bin 11. Cross-beam 12 has an auger assembly carrier 15 which carries an auger assembly 16 back and forth between side 32 and side 33. Cross-beam 12 has a motor 13 which moves cross-beam 12 back and forth along the length of processing bin 11, between front end 30 and back end 31 on track 14. Motor 13 also moves auger assembly 16 back and forth along the width of processing bin 11, between the first side 32 and the opposite side 33, on auger assembly carrier 15. Auger assembly 16 comprises two or more mixing augers 17 which are rotated by auger motors 18 so as to lift the manure placed in processing bin 11.

Figure 2:
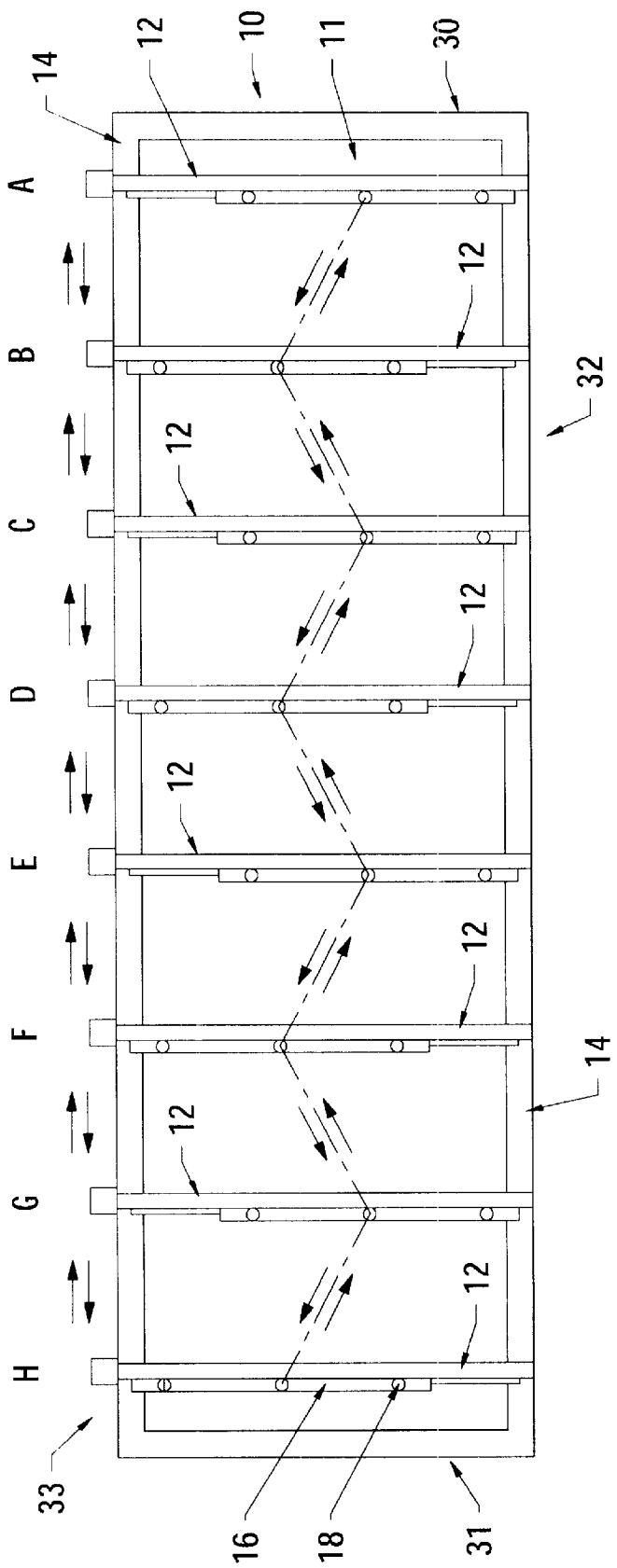
FIG. 2 illustrates the linear movement of the cross-beam and the side-to-side movement of the auger assembly in the processing bin.

FIG. 2 illustrates the interaction of cross-beam 12 and auger assembly 16 as cross-beam 12 moves back and forth along the length of processing bin 11. At position A cross-beam 12 is at front end 30, and auger assembly is at first side 32. As cross-beam 12 moves to position B towards back end 31, auger assembly 16 moves on carrier 15 to opposite side 33. As cross-beam 12 moves to position C towards back end 31, auger assembly 16 moves back to first side 32. This process continues as cross-beam 12 through positions D through G to the back end 31 of processing bin 11. When cross-beam 12 reaches back end 31, it triggers a switch which causes cross beam 12 to move back to front end 30. Likewise, when auger assembly 16 reaches a first side 32 of processing bin 11, it triggers a switch which causes the auger assembly to move to the opposite side 33. The movement of cross-beam 12 from one end to the other and the auger assembly from one side to the other proceeds simultaneously, continuously, and at any rate of movement as desired. Processing bin 11 can have any desired dimensions, preferably being about 45 feet in length, 15 feet in width, and 12 feet in height. Mixing augers 17 can be of any desired dimensions, preferably being about 4 inches in diameter and extending downward to just above the bottom of bin 11.

Figure 3:
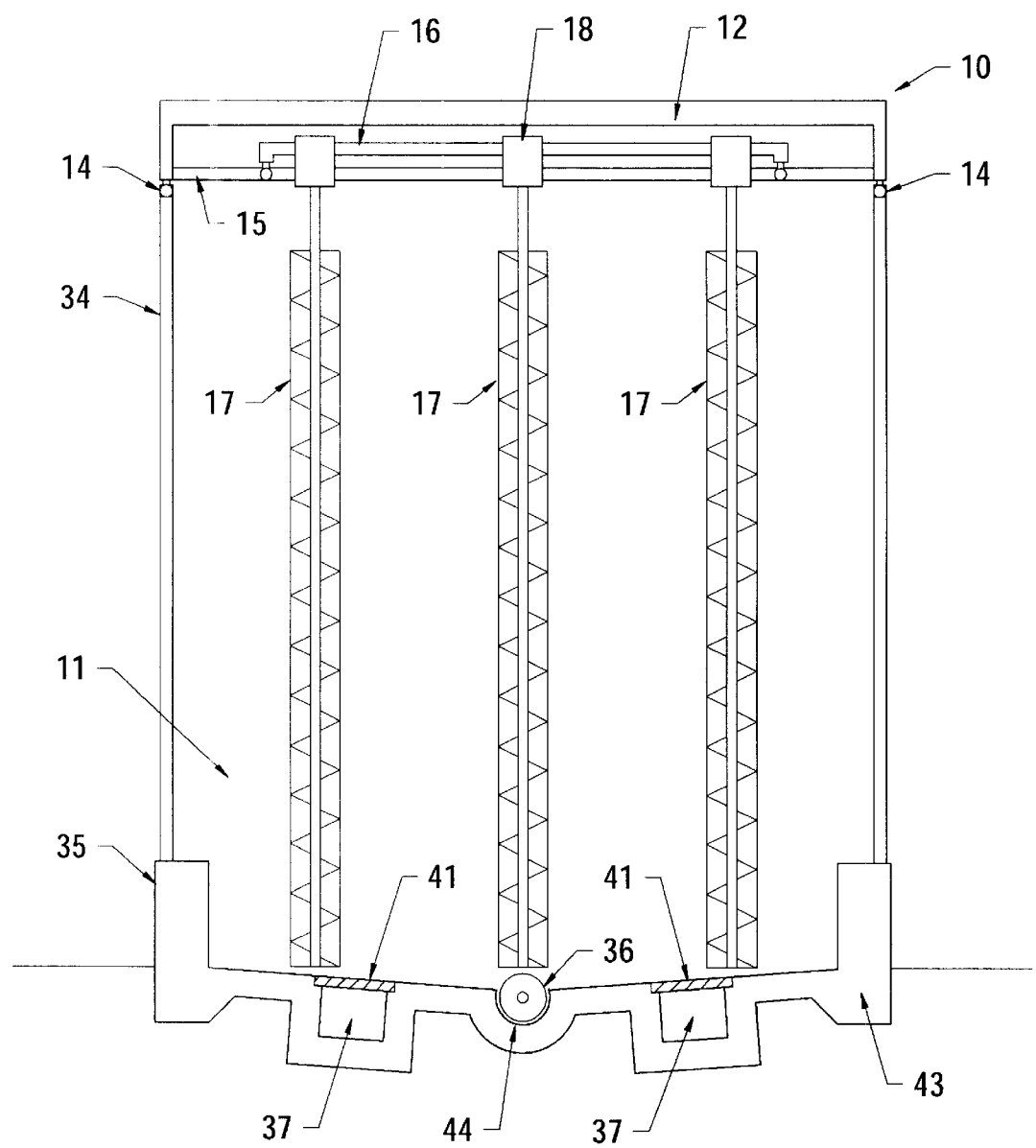
FIG. 3 is an end view of the manure processing apparatus.

FIG. 3 illustrates an end view of processing bin 11. Mixing augers 17 depend from auger assembly 16 from cross-beam 12 at the top portion 34 of processing bin 11 to the bottom portion 35. Bottom portion 35 has a bottom auger 36 which removes compost or dried manure from processing bin 11. Bottom portion 35 also has heating ducts 37 with plate covers 41. Plate covers 41 have holes 42 for air to pass from the heating ducts 37 to processing bin 11. Processing bin preferably rests on a cement foundation 43 which forms the heating ducts 37 and a groove 44 to hold bottom auger 36. Bottom auger 36 can be any desired dimension, preferably 12 inches in diameter and extending the length of bin 11.

Figure 4:
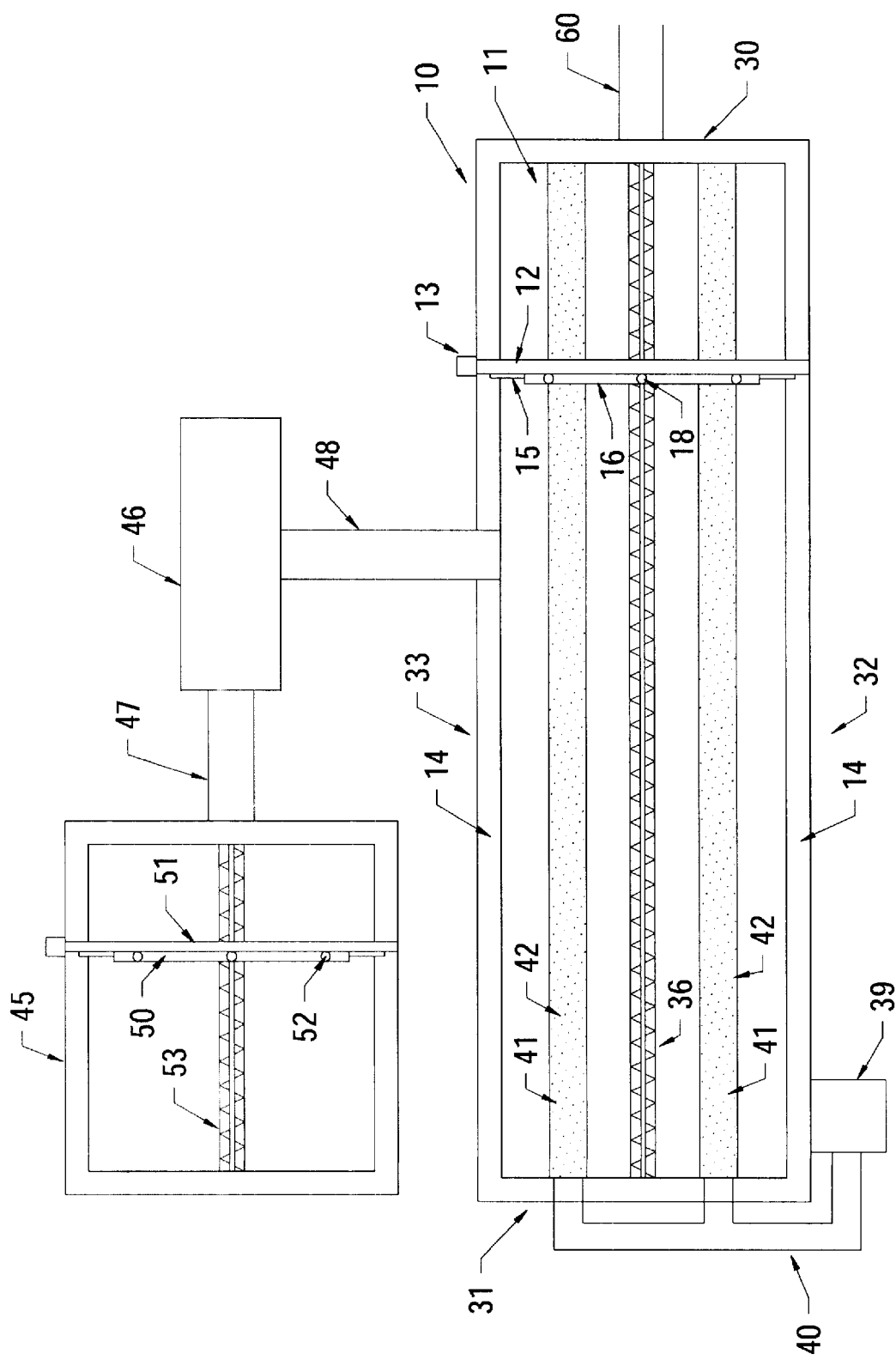
FIG. 4 is a diagrammatic illustration of the manure processing apparatus in conjunction with a preprocessing bin and a grinder.

FIG. 4 shows additional elements of the present invention which can be, preferably, included for processing manure. Preprocessing bin 45 is constructed similar to processing bin 11 except that auger assembly 50 is fixed to cross-beam 51. The augers 52 in preprocessing bin 45, thus, move only back and forth along the length of preprocessing bin 45 and not from side to side. Heat is supplied from the top of preprocessing bin 45 by an air conditioning system (not shown). Preprocessing bin 45 is used to remove some of the moisture rapidly from the manure. Once this initial removal of moisture is completed, the manure is transferred to grinder 46 by bottom auger 53 and conveyor 47. Preprocessing bin 45 can have any desired dimensions, preferably being about 19 feet in length, 14 feet in width, and 12 feet in height. The dimensions of the augers 52 and 53 are similar to those described for processing bin 11. Any suitable grinder or hammermill known in the art may be used to grind the manure, such as, for example, a Gehl Grinder Mixer 170 (Westbend, Wis.). This grinding step ensures that the manure is broken up into particles of any desired size which facilitates homogenization in processing bin 11. Manure leaving grinder 46 can be transferred to processing bin 11 by conveyor 48. When manure processing is complete in bin 11, the final product can be conveyed out of bin 11 by auger 36 to conveyor 60. Also shown is duct 40 and air conditioning system 39.

Manure, particularly chicken manure, can be processed relatively rapidly at low cost in the manure processing apparatus of the present invention to produce a compost fertilizer or animal feed that is essentially free of objectionable odor. In a preferred embodiment the manure is first pre-processed in preprocessing bin 45 to remove water and moisture as needed. Auger system 50 is moved back and forth along the length of processing bin 45 by cross beam. 51. As augers 52 rotate they lift the manure from the bottom to the top of the preprocessing bin 45. The auger system 50 could also be adapted to move from side to side in addition, as described for processing bin 11, but this is not necessary. The manure in preprocessing bin 45 can be heated from above by any suitable heating source. The manure could also be heated from the bottom but this is also not necessary. Preprocessing bin 45 can be filled to its top with the manure.

When sufficient water and moisture is removed from the manure in preprocessing bin 45 it is transferred by bottom auger 53 to conveyor 47. Conveyor 47 transfers the manure to grinder 46, which grinds up any clumps, aggregated material, and any other debris in the manure, producing a relatively uniform manure substance which is suitable for homogenizing and mixing. The preprocessed, ground manure substance is then transferred to processing bin 11 for further drying and/or composting. Processing bin 11 can be filled to its top with the manure.

The manure in processing bin 11 is homogenized or mixed by the action of augers 17 which are driven to rotate by motors 18 to raise the manure from bottom 35 to top 34. The augers 17 simultaneously move from one end of the processing bin 11 to the other within about 5 to 10 minutes. Thus, the augers 17 will make a complete cycle from front 30 to back 31 and from back 31 to front 30 within about 10 to 20 minutes. At the same time heated air from heating ducts 37 is forced through holes 42 into the manure from the bottom 35 of processing bin 11. Only the bottom portion of the manure, about two feet from the bottom, needs to be heated because the augers 17 will lift this manure, and the lifted manure will be replaced by manure from the top. By this process of moving the augers 17 back and forth along the length of processing bin 11 and heating the manure from the bottom, the manure is thoroughly homogenized, mixed, and dried. Consequently, the manure can be completely and uniformly composted or dried, producing a product that is devoid of objectionable odor. The processes is substantially more effective in composting and drying if the augers 17 are also moved back and forth from side to side of processing bin 11 while simultaneously moving back and forth along the length of processing bin 11, as illustrated in FIG. 2.

Air conditioning system 39 provides heated air at any desired temperature and rate to compost or dry the manure. The air is forced into heating ducts 37 via duct 40. The air is forced through holes 42 in plate 41 and into the bottom portion of the manure. Plate 41 is, preferably, removable so that plate 41 and heating ducts 37 can be easily washed and cleaned. The temperature of the manure can be monitored by temperature monitoring devices such as, for example, thermometers and thermistors which are well known in the art. A temperature monitoring device can be positioned anywhere in processing bin 11, but preferably suspended from auger assembly 16. Temperature can be monitored electronically and the signal from the temperature monitor can be processed by a computer system, by methods well known in the art, to regulate air flow, air temperature, speed of rotation of the augers 17, rate of movement of the cross-beam 12 along the length of bin 11, and the rate of movement of auger assembly 16 from side to side across bin 11. These factors and elements can be regulated and adjusted automatically by the computer system as desired to produce compost and feed at any desired rate with any desired moisture content. A similar computer system and temperature monitor can be applied to preprocessing bin 45.

Figure 5:
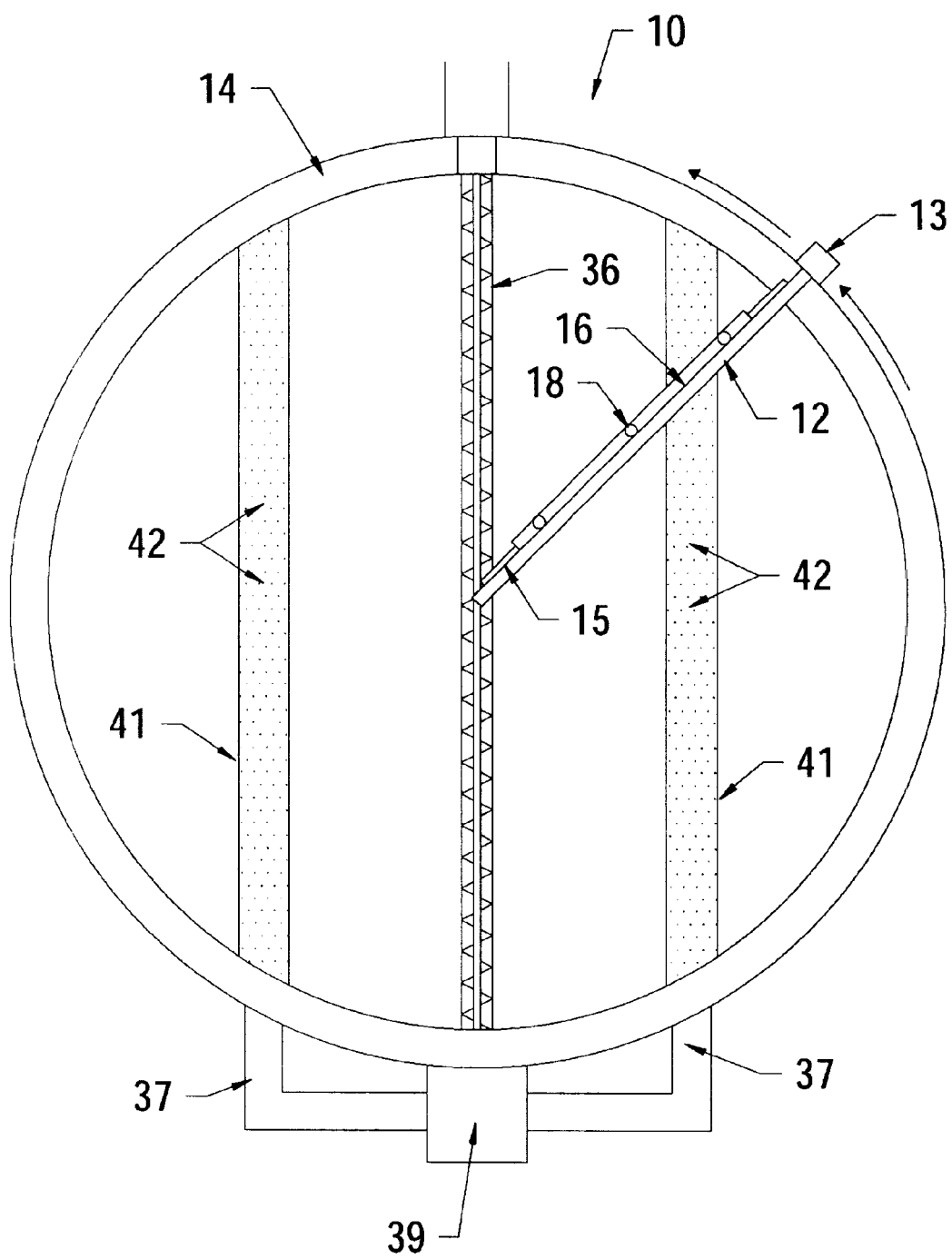
FIG. 5 illustrates a circular embodiment of the processing bin of the present invention.

FIG. 5 illustrates an alternate embodiment 70 of the present invention. Processing bin 71 is circular instead of rectangular. Cross beam 12 is an arm which extends from the periphery 72 of bin 71 the center 73 of bin 71, and can be supported and held in place by an I-beam. Cross beam 12 also has an auger assembly carrier 15, an auger assembly 16, and mixing auger motors 18 which rotate vertically oriented mixing augers (not shown). The circular processing bin 71 operates in a similar fashion as the rectangular processing bin 11 except that cross beam 12 moves around the periphery of bin 11 on track 14, driven by motor 13. The auger assembly, thus, is moved in a continuous circular path around the interior of bin 71. Simultaneously, auger assembly 16 moves back and forth between the periphery 72 and the center 73 (along the radius of bin 71), also driven by motor 13. Bin 71 has an air conditioning system 39 to deliver air and heat to bin 71, as described for bin 11.

The foregoing description has been limited to specific embodiments of this invention. It will be apparent, however, that variations and modifications may be made by those skilled in the art to the disclosed embodiments of the invention, with the attainment of some or all of its advantages and without departing from the spirit and scope of the present invention. For example, any type of manure can be processed for compost or feed in the present invention. The temperature can be elevated sufficiently to sterilize the compost or feed. Multiple air conditioning systems can be used. The bins can be emptied by means other than an auger, such as shovels, scoops, and the like.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A method of processing manure, comprising the steps of:
    a) raising the manure continuously across the length and width of a processing bin; and
    b) delivering air and heat to a bottom portion of the manure.

2. A method of processing manure, comprising the steps of:
    a) raising the manure continuously across the length and width of a processing bin;
    b) delivering air and heat to the manure; and
    c) drying and sterilizing the manure to produce feed.

3. A method of processing manure, comprising the steps of:
    a) raising the manure continuously across the length and width of a processing bin;
    b) delivering air and heat to the manure; and
    c) continuously monitoring the temperature of the manure and adjusting air flow, moisture, and temperature automatically within said bin.

4. A method of processing manure, comprising the steps of:
    a) raising the manure continuously across the length and width of a processing bin;
    b) delivering air and heat to the manure; and
    c) controlling the raising of the manure and the delivering of air and heat automatically by a computer and temperature monitoring device.

5. A method of processing manure, comprising the steps of:
    a) grinding the manure;
    b) preprocessing the manure to adjust moisture;
    c) raising the manure continuously across the length and width of a processing bin; and
    d) delivering air and heat to the manure to adjust moisture.

6. The method of claim 5 further comprising the step of composting the manure for use as a fertilizer.

7. A manure processing apparatus, comprising:
    a) a processing bin having a defined width and length;
    b) a plurality of augers within said bin, arranged vertically and adapted to move back and forth along the length and width of said bin;
    c) an air conditioning system to deliver air and heat to said bin; and
    d) said augers constructed to raise the manure continuously and the air conditioning system constructed to deliver air and heat from the bottom of the manure.

8. The apparatus of claim 7 further comprising a grinder.

9. The apparatus of claim 7 further comprising a preprocessing bin.

10. The apparatus of claim 7 further comprising a crossbeam to suspend said augers and move said augers back and forth along the length of said bin.

11. The apparatus of claim 10 wherein said cross beam has a track to move said augers along the width of said bin.

12. The apparatus of claim 7 wherein the augers and air conditioning system are adapted to convert the manure to compost.

13. The apparatus of claim 7 wherein the augers and air conditioning system are adapted to convert the manure to feed.

14. A manure processing apparatus, comprising:
    a) a processing bin having a defined width and length;

b) a plurality of augers within said bin, arranged vertically and adapted to move back and forth along the length and width of said bin;

c) an air conditioning system to deliver air and heat to said bin; and d) said air conditioning system constructed to continuously monitor temperature of the manure and adjust air flow, moisture, and temperature automatically within said bin.

15. A manure processing apparatus, comprising:

a) a processing bin having a defined width and length;

b) a plurality of augers within said bin, arranged vertically and adapted to move back and forth along the length and width of said bin;

c) an air conditioning system to deliver air and heat to said bin; and d) a computer system and temperature monitoring device to operate said augers and said air conditioning system automatically.

16. A manure processing apparatus, comprising:

a) a circular processing bin;

b) a plurality of augers within said bin, arranged vertically and adapted to move in a circular path within said bin;

c) an air conditioning system to deliver air and heat to said bin;

d) a cross-beam to suspend said augers and move said augers back and forth along the radius of said bin; and e) said augers constructed to raise the manure continuously and the air conditioning system constructed to deliver air and heat from the bottom of the manure.

* * * * *